United States Patent
Rupp et al.

(10) Patent No.: US 11,125,278 B2
(45) Date of Patent: Sep. 21, 2021

(54) DUAL CLUTCH UNIT WITH ELECTRIC DRIVE

(71) Applicant: GKN Automotive Ltd., Redditch (GB)

(72) Inventors: Waldemar Rupp, Hürth (DE); Marc Absenger, Wuppertal (DE)

(73) Assignee: GKN Automotive Ltd., Redditch (GB)

( * ) Notice: Subject to any disclaimer, the term of this patent is extended or adjusted under 35 U.S.C. 154(b) by 69 days.

(21) Appl. No.: 16/610,086

(22) PCT Filed: May 9, 2017

(86) PCT No.: PCT/EP2017/061065
§ 371 (c)(1),
(2) Date: Nov. 1, 2019

(87) PCT Pub. No.: WO2018/206089
PCT Pub. Date: Nov. 15, 2018

(65) Prior Publication Data
US 2020/0080598 A1 Mar. 12, 2020

(51) Int. Cl.
| F16D 13/38 | (2006.01) |
| B60K 1/00 | (2006.01) |
| B60K 17/02 | (2006.01) |
| F16D 21/06 | (2006.01) |
| F16D 23/12 | (2006.01) |

(Continued)

(52) U.S. Cl.
CPC ............ F16D 13/385 (2013.01); B60K 1/00 (2013.01); B60K 17/02 (2013.01); F16D 21/06 (2013.01);
(Continued)

(58) Field of Classification Search
CPC ........ H02K 7/003; H02K 7/006; H02K 7/108; B60K 2023/043
See application file for complete search history.

(56) References Cited

U.S. PATENT DOCUMENTS 3,772,940 A * 11/1973 Ohtsuka ................. F16D 55/40
475/144
6,305,517 B1 * 10/2001 Cole ....................... F16D 25/10
192/109 R (Continued)

FOREIGN PATENT DOCUMENTS

| AT | 007740 U1 | 8/2005 |
| DE | 10225873 A1 | 3/2003 |

(Continued)

OTHER PUBLICATIONS

International Search Report and Written Opinion for PCT/EP2017/061065 dated Feb. 13, 2018 (11 pages; with English translation).

*Primary Examiner* — Stacey A Fluhart
(74) *Attorney, Agent, or Firm* — Bejin Bieneman PLC

(57) ABSTRACT

A dual clutch unit for variable torque distribution to two output shafts comprises: a clutch input part rotatably drivable about an axis; a first disk pack for transmitting torque from the clutch input part to a first clutch output part, wherein the first disk pack is axially loadable by a first pressure plate and is axially supported against the clutch input part via a first intermediate plate; a second disk pack for transmitting torque from the clutch input part to a second clutch output part, wherein the second disk pack is axially loadable by a second pressure plate and is axially supported against the clutch input part via a second intermediate plate; wherein the first intermediate plate and the second intermediate plate are axially arranged between the first disk pack and the second disk pack and are axially engaged with each other such that they are axially supported independently of each other against the clutch input part.

19 Claims, 5 Drawing Sheets

(51) Int. Cl.
  *H02K 7/00*      (2006.01)
  *H02K 7/108*     (2006.01)
  *F16D 25/0638*   (2006.01)
  *F16D 25/10*     (2006.01)

(52) U.S. Cl.
  CPC ......... *F16D 23/12* (2013.01); *F16D 25/0638* (2013.01); *F16D 25/10* (2013.01); *H02K 7/003* (2013.01); *H02K 7/006* (2013.01); *H02K 7/108* (2013.01); *F16D 2021/0661* (2013.01); *F16D 2021/0692* (2013.01); *F16D 2023/123* (2013.01)

(56) References Cited

U.S. PATENT DOCUMENTS

| | | | |
|---|---|---|---|
| 7,011,199 B2* | 3/2006 | Onishi | F16D 25/0638 |
| | | | 192/48.611 |
| 9,003,925 B2* | 4/2015 | Corliss | F16H 48/19 |
| | | | 74/661 |
| 2006/0144665 A1 | 7/2006 | Janson et al. | |
| 2009/0084652 A1 | 4/2009 | Kummer et al. | |
| 2017/0261045 A1* | 9/2017 | Chamberlin | F16D 25/123 |
| 2018/0236865 A1* | 8/2018 | Lorenz | B60K 6/40 |
| 2019/0308496 A1* | 10/2019 | Reimnitz | H02K 7/085 |

FOREIGN PATENT DOCUMENTS

| | | |
|---|---|---|
| JP | H0218116 A | 1/1990 |
| JP | 2010-241178 A | 10/2010 |
| WO | 2012038159 A1 | 3/2012 |
| WO | 2014090817 A1 | 6/2014 |
| WO | 2018095461 A1 | 5/2018 |

\* cited by examiner

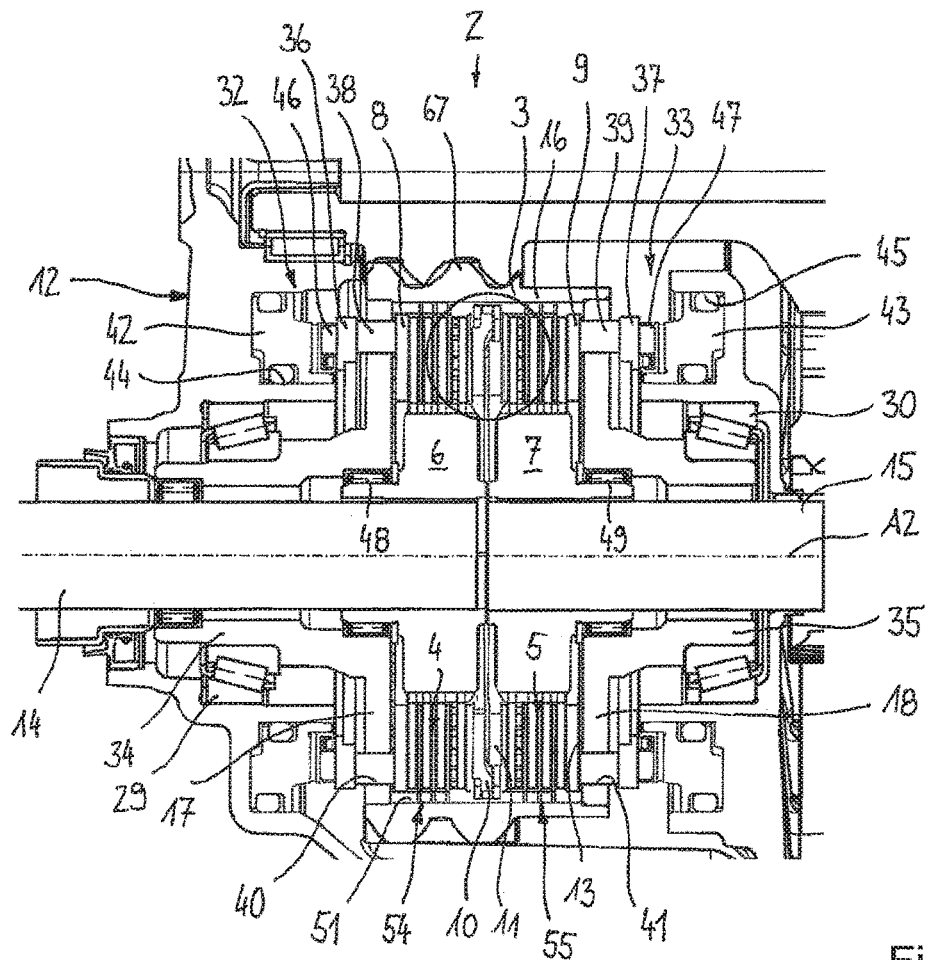
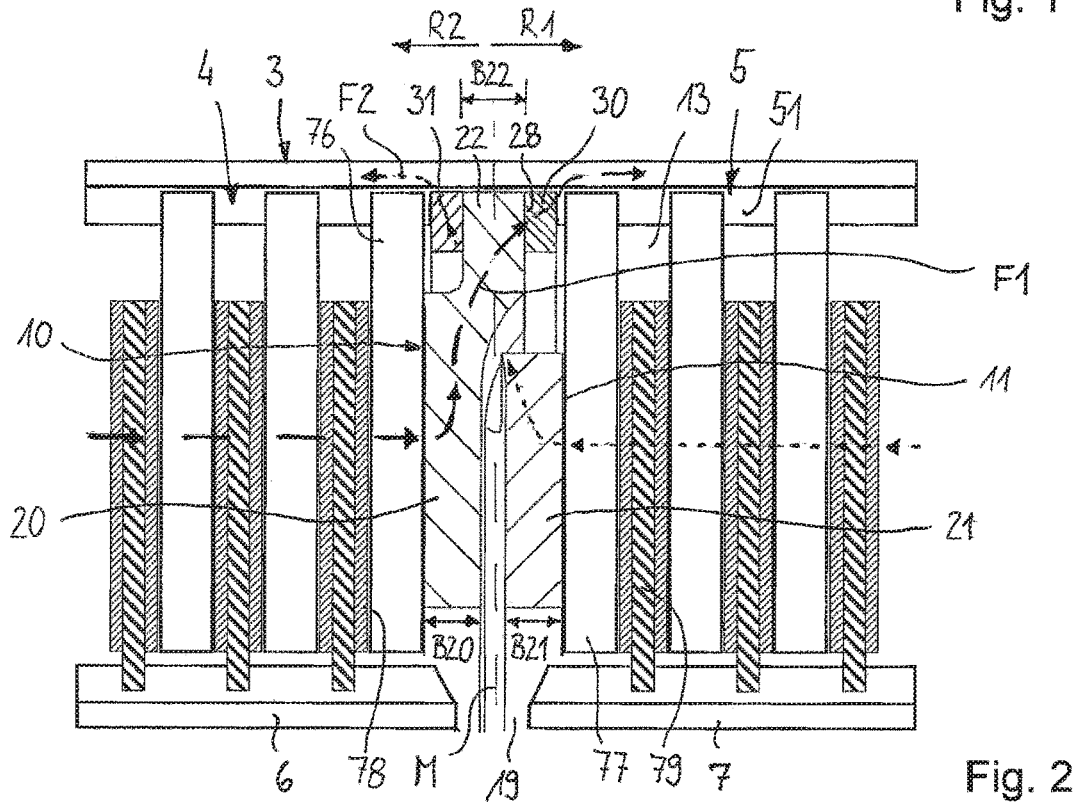
Fig. 1
Fig. 2

DUAL CLUTCH UNIT WITH ELECTRIC DRIVE

CROSS-REFERENCE TO RELATED APPLICATIONS

This application is a national stage of, and claims priority to, Patent Cooperation Treaty Application No. PCT/EP2017/061065, filed on May 9, 2017, which application is hereby incorporated herein by reference in its entirety.

BACKGROUND

Dual clutch units for an individual variable torque distribution of an introduced torque to two output shafts are used, for example, in drivelines of motor vehicles in order to be able to control the torque distribution between two vehicle wheels or vehicle axles in a targeted manner in order to improve the driving dynamics of the vehicle.

From AT 007 740 U1 an electric auxiliary drive is known for an axle of a motor vehicle which is not driven in normal operation. The auxiliary drive comprises an electric motor, a reduction transmission and two controllable clutches, each of which is drivingly connected to an associated axle shaft. The two clutches have a common outer part which is configured as a cylindrical hollow body. A central ring part is provided in the outer part, against which the two clutches are axially supported.

The JP 2010-241178 shows an electric drive with a similar arrangement of electric motor, reduction transmission and clutches.

From DE 102 25 873 A1 another power distribution device for a hybrid vehicle is known. The device comprises an electric motor, a reduction transmission and two clutches for variably distributing torque to two side shafts of the corresponding drive axle.

SUMMARY

A compact and light structure for a component is always a design goal. For double clutches of the above type, a compact structure can be achieved by arranging the two clutches directly adjacent to each other.

Starting from this, disclosed herein is a dual clutch unit for controllably distributing torque to two output shafts, which has a compact structure and ensures safe individual actuation of the two clutches.

A dual clutch unit for variably distributing torque to two output shafts, comprises: a clutch input part rotatably drivable about an axis of rotation; a first disk pack for transmitting torque from the clutch input part to a first clutch output part, wherein the first disk pack is axially loadable by a first pressure plate and is axially supported against the clutch input part via a first intermediate plate; a second disk pack for transmitting torque from the clutch input part to a second clutch output part, wherein the second disk pack is axially loadable by a second pressure plate and is axially supported against the clutch input part via a second intermediate plate; wherein the first intermediate plate and the second intermediate plate are axially arranged between the first disk pack and the second disk pack and are designed axially inter-engagingly such that they are axially supported independently of one another against the clutch input part.

An advantage of the dual clutch unit is that actuating one disk pack has no influence whatsoever on the respective other disk pack. Due to the axially interleaving structure of the two intermediate plates, the first axial forces acting from the first disk pack on the clutch input part and the second axial forces acting from the second disk pack on the clutch input part cross each other, wherein the two intermediate plates each lie outside the flux of force of the respective other intermediate plate. An unwanted overresponse of the respective clutch, i.e., a stronger response than desired, is thus prevented. As a result, the torque required at each output shaft is quickly and accurately adjustable, resulting in improved driving dynamics and stability. In addition, the axially interleaving design of the two intermediate plates results in a short axial installation space, which has a favourable effect on the weight of the unit.

According to an embodiment, the first intermediate plate has a first contact surface, which faces axially away from the first disk pack and which is axially supported against the clutch input part in a first direction, and the second intermediate plate has a second contact surface, which faces axially away from the second disk pack and which is axially supported against the clutch input part in an opposite second direction. The first contact surface and the second contact surface are arranged axially offset relative to each other, in particular in the direction of the respectively opposite disk pack. More specifically, it can be provided that the first intermediate plate comprises first portions and the second intermediate plate comprises second portions which extend axially into each other such that the first intermediate plate and the second intermediate plate are each disposed outside a flux of force from the respective other one of the first and second intermediate plates to the clutch input portion.

The first intermediate plate can comprise a first ring portion, against which the first disk pack is axially supported, and the second intermediate plate can comprise a second ring portion, against which the second disk pack is axially supported, wherein both ring portions are axially spaced apart from each other. The axial support of the disk pack against the respective intermediate plate can be effected directly, i.e. via a last outer or inner plate of the respective disk pack, or indirectly, in particular via an interposed pressure plate. The radial distance between the intermediate plates is in particular at least such that even with maximum elastic deformation of the two intermediate plates due to axial actuating forces, they do not come into contact with each other. This ensures that even when the clutches are actuated there are no axial forces acting between the two intermediate plates which could lead to a deviation of the desired clutch torque.

According to an embodiment, the first intermediate plate comprises a plurality of first support portions distributed over the circumference, with which the first intermediate plate is axially supported against the clutch input part, and the second intermediate plate comprises a plurality of second support portions distributed over the circumference, with which the second intermediate plate is axially supported against the clutch input part. The first and second support portions, which also can be referred to as support segments, are arranged offset to each other in circumferential direction and/or arranged with axial overlap to each other.

Between respective first support portions distributed over the circumference, first recesses can be formed, into which the second support portions extend axially. Accordingly, between the second support portions distributed over the circumference respective second recesses can be formed, into which the first support portions extend axially. By this design an axially nested structure of the two intermediate plates with a short axial overall length is achieved. The axial width of the axially overlapping first and second support portions can be smaller than the axial width of the two ring portions taken together.

According to a possible specification, a circumferential extension of the first support portions can be smaller than a circumferential extension of the second recesses located between the second support portions. Accordingly, a circumferential extension of the second support portions may be smaller than a circumferential extension of the first recesses located between the first support portions.

In principle, the number of support portions distributed over the circumference and the corresponding number of recesses distributed over the circumference can be arbitrarily selected. For example, two, three, four, five, six, or more, circumferentially distributed support portions may be provided, which in particular can be regularly distributed over the circumference. The circumferential extension and distribution of the support portions can be favourably configured such that a secure axial support with minimum elastic deformability and possibly little materials usage is provided.

Between the first ring portion and the first support portions, respective cranked first transition portions can be formed, each extending axially in the direction of the second disk pack (first direction). Accordingly, between the second ring portion and the second support portions respective cranked second transition portions can be formed, which extend axially in the direction of the first disk pack (second direction).

According to an embodiment, the first support portions and the second support portions can be connected to the clutch input part in a rotationally fixed manner, in particular by form-locking engagement means. The clutch input part can have an elongated toothing structure to which the associated input plates of the first and second clutch as well as the first and second support portions are connected with matching toothings in a rotationally fixed manner.

The interleaved first and second support portions of the two intermediate plates are axially fixed to the clutch input part, in particular by means of two retaining rings. For a compact design, it is advantageous if the two retaining rings lie within the axial extension of the first and second intermediate plate.

The two intermediate plates are preferably of the same design in view of a favourable production and assembly.

According to a possible embodiment, a first actuator is provided for loading the first disk package and a second actuator is provided for loading the second disk package, wherein the two actuators are controllable independently of one another by one control unit, so that a first torque transmittable from the first disk package to the first clutch hub and a second torque transmittable from the second disk package to the second clutch hub can be variably adjusted independently of one another.

According to an embodiment the clutch input part can be configured as a clutch basket, which is rotatably supported in a stationary housing and which forms a receiving chamber in which the first disk pack, the first intermediate plate, the second intermediate plate and the second disk pack are accommodated. In a specific configuration, the clutch basket can have two cover portions which laterally delimit the receiving chamber of the clutch basket, wherein the two actuators can each be arranged outside the clutch basket and can be supported against the housing. For transmitting the forces generated by the actuators to the associated disk pack, a respective force transmission member can be provided, wherein the respective cover portion has a plurality of circumferentially distributed through openings through which cams of the associated force transmission member extend.

A further solution of the above object is an electric drive for driving a drive axle of a motor vehicle, comprising: an electric machine with a motor shaft; a transmission unit configured to translate a rotational movement introduced by the electric machine from high speed to slow speed; and a dual clutch unit according to one of the above embodiments, wherein the clutch input part is rotatably drivable by an output gear of the transmission unit.

The dual clutch unit contributes in an advantageously manner to fast and precise adjustment of the desired torque on the respective output shaft, which has a favourable effect on driving dynamics and driving stability, respectively. In addition, the axially inter-engaged structure of the two intermediate plates contributes to a short axial overall length of the entire electric drive assembly.

According to a possible embodiment, the electrical machine can be arranged coaxially to the double clutch unit. For this it is proposed in particular that the motor shaft is formed as a hollow shaft which is rotatably supported around an axis of rotation in a stationary housing, wherein the clutch input part is rotatably supported coaxially to the axis of rotation of the motor shaft, and that the transmission unit has a transmission shaft, which is rotatably drivable by the motor shaft and is rotatably supported in the housing about an axis of rotation parallel to the axis of rotation of the motor, and in that the first clutch output part is configured to drive a first output shaft and the second clutch output part is configured to drive a second output shaft, wherein one of the two output shafts extends through the hollow shaft of the electric machine. Overall, this embodiment is particularly compact.

BRIEF SUMMARY OF THE DRAWINGS

Preferred examples are explained below using the drawing figures.

FIG. 1 shows a dual clutch unit in a first embodiment in longitudinal section;

FIG. 2 shows a detail of the dual clutch unit from FIG. 1 in enlarged view;

DESCRIPTION

FIGS. 1 to 4, which are jointly described below, show an example dual clutch unit 2, which can also be referred to as a clutch assembly. The dual clutch unit 2 is used in particular in the driveline of a motor vehicle for variably distributing torque from one input part 3 to two output parts 6, 7. For this purpose, the dual clutch unit 2 has two separately controllable friction clutches 54, 55 whose transmittable torque can be variably adjusted individually.

This makes the dual clutch unit 2 suitable for active control of the yaw movement and the yaw angle speed of the vehicle, respectively. This is achieved by distributing and/or selectively adjusting torque of the left and right side shafts of a drive axle in different ways. Such variable torque distribution systems are also referred to as "torque vectoring" systems or "active yaw" systems. The control principle is also referred to as active torque distribution or "torque vectoring".

Figure 3:
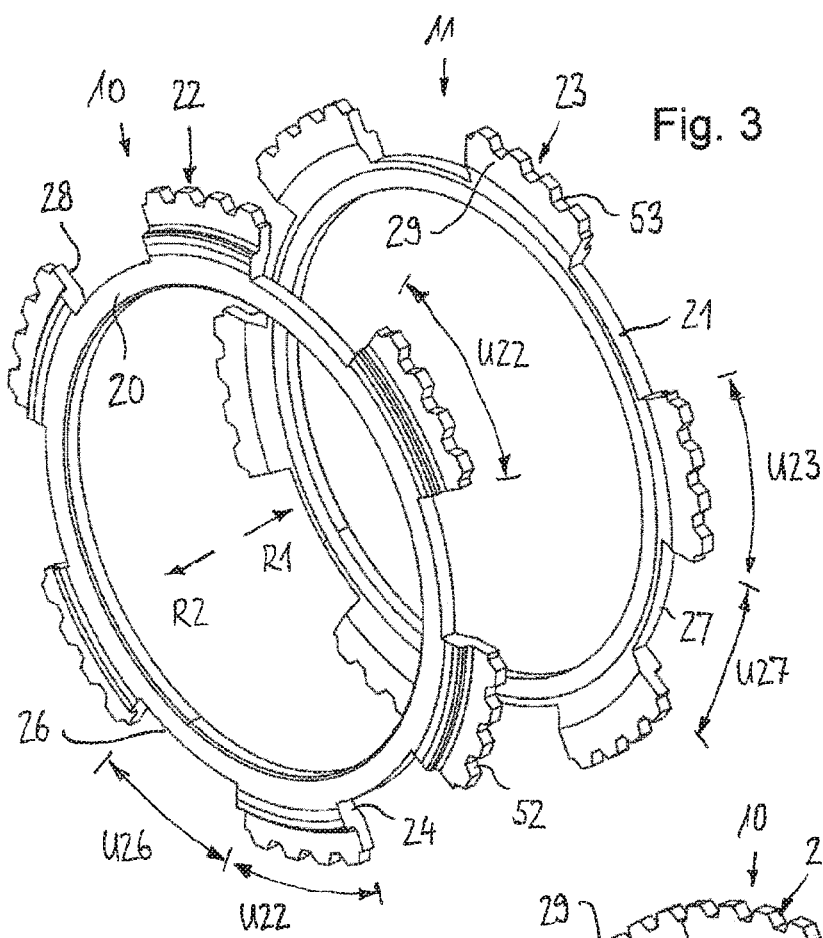
FIG. 3 shows the intermediate plate arrangement from FIG. 1 in a perspective exploded view.
Figure 4:
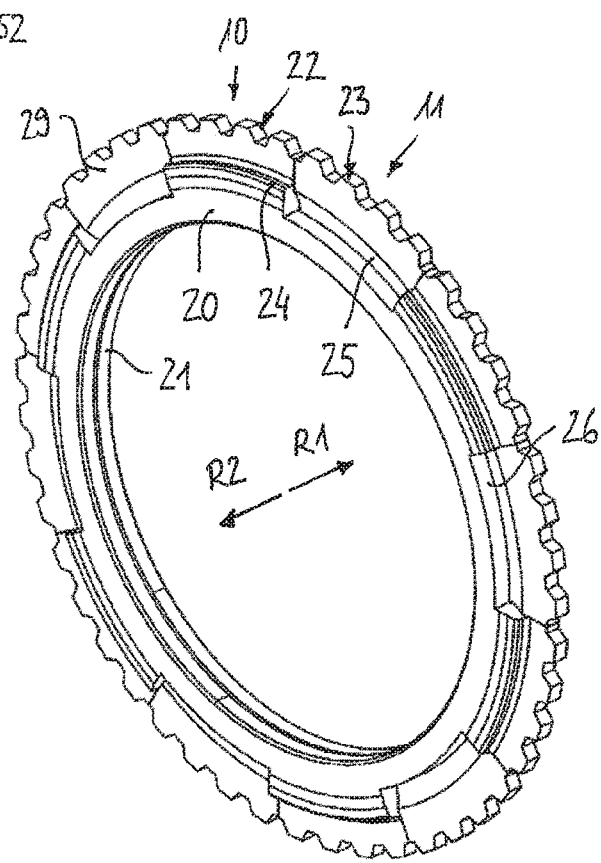
FIG. 4 shows the intermediate plate arrangement from FIG. 1 in assembled state in a perspective view.
Figure 5:
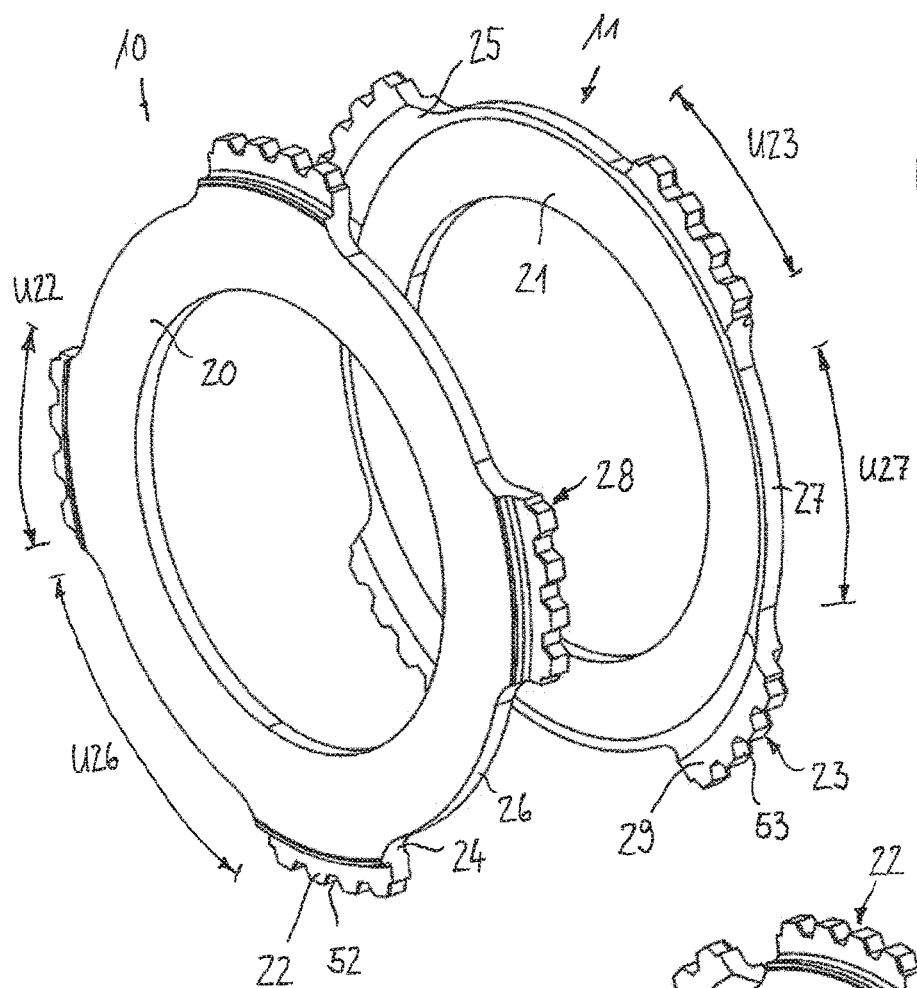
FIG. 5 shows an intermediate plate arrangement for an inventive dual clutch unit in a further embodiment in a perspective explosion view.

The dual clutch unit 2 has an input part 3 rotatingly driveable about an axis of rotation A2, two disk packs 4, 5 and two output parts 6, 7. The first disk pack 4 serves for variably transmitting torque from the clutch input part 3 to the first output part 6, while the second disk pack 5 serves for variably transmitting torque from the clutch input part 3 to the second output part 7. The two disk packs 4, 5 can be individually loaded with force, so that the torque to be transmitted to the respective side shaft can be precisely adjusted according to the requirements. The two disk packs 4, 5 can be axially loaded in the direction towards each other by an associated pressure plate 8, 9 and are each axially supported against an associated support element 10, 11. The two support elements 10, 11, which are arranged axially between the two disk packs 4, 5, are in turn axially supported against the clutch input part 3. In FIGS. 2 to 4 in particular, it can be seen that the two support elements 10, 11 are axially interleaved so that they are supported axially against the clutch input part 3 independently of each other. The support elements 10, 11 are also referred to as intermediate plates; they are functionally arranged between the corresponding disk pack 4, 5 for transmitting force to the input part 3.

The clutch input part 3 is presently formed as a clutch basket which is rotatably supported in a stationary housing 12, and the output parts 6, 7 are each formed as clutch hubs. It is to be understood, however, that in principle a reverse design is also possible, i.e., the input part could be configured as a clutch hub and the output parts as clutch baskets.

The clutch basket 3 forms a receiving chamber 13 in which the first disk pack 4, the first intermediate plate 10, the second intermediate plate 11 and the second disk pack 5 are accommodated. The clutch basket 3 has a circumferential casing portion 16 and two cover portions 17, 18, which laterally delimit the receiving chamber 13. The disk packs 4, 5 each comprise several outer plates which are rotationally fixed and axially movable with the clutch basket 3 as well as several inner plates which are rotationally fixed and axially movable with the associated clutch hub 6, 7, which are arranged axially alternating. The two clutches 54, 55 can have the same design, in particular with regard to their geometric dimensions such as the outer diameter of the hub, the inner diameter of the hub, the diameter of the outer and inner plates. The first clutch hub 6 is connected to a first output shaft 14 and the second clutch hub 7 is connected to a second output shaft 15.

As can be seen in particular in FIGS. 3 and 4, the two intermediate plates 10, 11 each have a ring portion 20, 21 for axially supporting the respective associated disk pack 4, 5 and a plurality of support portions 22, 23 distributed over the circumference for connecting to the input part 3. An axial actuating force F1 effective when actuating the first disk pack 4 is introduced from the disk pack 4 to the first ring portion 20 and is axially supported against the input part 3 via the first support portions 22. Accordingly, an axial actuating force F2 effective when actuating the second disk pack 5 is introduced from the disk pack 5 to the ring portion 21 of the second intermediate plate 11 and is axially supported via the associated second support portions 23 against the input part 3 in the opposite second direction R2. An axial gap 19 is formed between the two ring portions 20, 21 so that they do not come into contact with each other even in the case of elastic deformation due to the axial actuating forces F1, F2. The two intermediate plates 10, 11 have the same design in view of easy production and assembly. In the present case, the outer disks 76, 77 adjacent to the centre plane M are in contact with and axially supported against the respective intermediate plates 10, 11. Depending on the thickness of the disks, a support plate of greater thickness can optionally be provided between the last outer disks 76, 77. It is also possible that the last outer disks 76, 77 are omitted, i.e. that the last inner disks 78, 79 are directly in contact with and axially supported against the respective intermediate plates 10, 11, or indirectly with an optional support plate being interposed.

The first support segments 22 extend radially outwards from the first ring portion 20 and are axially offset relative thereto, wherein cranked transition portions 24 are formed between the ring portion 20 and the support segments 22. The second intermediate plate 11 is formed analogously, i.e., the second support segments 23 extend radially outwards from the second ring portion 21 and are axially offset relative thereto in direction of the centre plane M, wherein cranked transition portions 25 are formed between the ring portion 21 and the support segments 23.

The first and second support portions 22, 23 are arranged offset to each other in a circumferential direction and overlap each other in an axial direction. In particular, the first and second support portions 22, 23 extend axially into one another such that the two intermediate plates 10, 11 each lie outside the flux of force of the respective other intermediate plate (11, 10) to the clutch input part. Between the circumferentially adjacent support portions 22, 23 of the two intermediate plates 10, 11, recesses 26, 27 are formed respectively, into which the support portions 23, 22 of the respective other intermediate plate 11, 10 extend axially. The support portions 22 of the first intermediate plate 10 and the support portions 23 of the second intermediate plate 11 lie in one plane, in the present case namely in a central plane M formed between the two disk packs. The two intermediate plates 4, 5 engage axially through each other with their outer support portions 22, 23, so that an interleaved structure of the two intermediate plates with a short axial overall length is achieved. The axial width B20 of the axially overlapping first and second support portions 22, 23 is in particular smaller than the sum of the axial width B20, B21 of the two ring portions 20, 21.

The number of support portions 22, 23 distributed over the circumference and the corresponding number of recesses 26, 27 distributed over the circumference is six for the embodiment according to FIGS. 3 and 4. The support portions 22, 23 and recesses 26, 27, respectively, are arranged regularly distributed over the circumference, wherein the circumferential extent U22, U23 of the support portions 22, 23 corresponds approximately to the circumferential extent U26, U27 of the recesses 26, 27 between them. The support portions 22, 23 and opposite recesses 27, 26 are configured in such a way that, when inserted axially into each other, clearance is provided between the two intermediate plates so that they are arranged in each other axially force-free. It is understood that a different number of support portions 22, 23 can also be used and that these can also be smaller than the respective opposite recesses 27, 26.

The first intermediate plate 10 is axially supported by the first support segments 22 in a first axial direction R1 against the clutch input part 3 and the second intermediate plate 11 is axially supported by the second support segments 23 in an opposite second direction R2 against the clutch input part 3. Specifically, the first support segments 22 each have a first contact surface 28 which faces axially away from the first disk pack 4 and which are axially supported against the clutch input part 3. Accordingly, the second support segments 23 each have a second contact surface 29, which faces axially away from the second disk pack 5 and are axially supported in the opposite direction against the clutch input part 3. The first contact surfaces 28 and the second contact surfaces 29 are arranged axially offset to each other in the direction of the respectively opposite disk pack.

The axial support is provided by two circlips 30, 31, of which the first circlip 30 is offset in the first direction R1 with respect to the centre plane M and forms an axial support for the first intermediate plate 4 and of which the second circlip 31 is offset in the second direction R2 with respect to the centre plane M and forms an axial support for the second intermediate plate 5. It can be seen in particular in FIG. 2 that the two retaining rings 30, 31 lie within the axial extension of the two intermediate plates 4, 5, so that the support assembly formed by the intermediate plates 4, 5 and retaining rings 30, 31 has a minimum axial extension.

The first and second support segments 22, 23 are rotationally fixedly connected to the clutch basket 3. For this purpose, the support segments 22, 23 have engaging means 52, 53 on their outer circumferential face, which engage corresponding engaging means 51 on the inner circumferential face of the clutch basket 3, and/or of the cylinder portion 16 of the basket, in a rotationally fixed manner. The engaging means 51 of the clutch input part 3 are formed in particular as an elongated toothing structure with which the outer plates of the two disk packs 4 and 5 are also engaged in a rotationally fixed and axially movable manner. The external engaging means 52, 53 of the support segments 22, 23 are designed appropriately, so that the intermediate plates 10, 11 are inserted into the clutch basket 3 by an axial joining movement and are axially fixed by means of the retaining rings 30, 31. Subsequently, the disk packs 4, 5 are inserted into the clutch basket 3.

The clutch basket 3 is made of three parts, wherein the cylinder portion 16 and the cover portions 17, 18 can be produced as separate components and subsequently joined together, in particular by welding. The cover portions 17, 18 each have an integrally formed sleeve projection 34, 35 to accommodate an associated clutch bearing, with which the clutch basket 3 is rotatably supported in the housing 12. The clutch basket 3 has a ring gear 67 on its outer circumferential face for introducing torque, which can in particular be configured in one piece with the clutch basket 3. The ring gear 67 is driven by an output gear of a transmission unit not shown here, wherein both gears can comprise helical gears.

Each of the two clutches 54, 55 can be individually actuated by an associated actuator 32, 33. For this purpose, the two actuators 32, 33 can be controlled independently of each other by a control unit (not shown), so that a first torque transmittable from the first disk pack 4 to the first clutch hub 6 and a second torque transmittable from the second disk pack 5 to the second clutch hub 24 can be variably adjusted independently of each other. The two actuators 32, 33 have the same design and mode of operation, which is why both are described together below. All features described for one actuator also apply to the other actuator. The two actuators 32, 33 are each arranged outside the clutch basket 3 and axially supported on the housing 12 in opposite axial directions.

A force transmission member 36, 37 is provided per clutch in order to transmit an axial force generated by the actuator to the associated disk pack 4, 5 arranged in the clutch basket 3. The force transmission members 36, 37 comprise a disc-shaped base body from which several cams 38, 39 project in axial direction, which can also be referred to as projections. The two cover portions 17, 18 each have several circumferentially distributed axial openings 40, 41 through which cams 38, 39 of the associated force transmission member 36, 37 extend. The cams 38, 39 are each firmly connected to the corresponding disc-shaped base body, in particular formed in one piece therewith, for example by a forming process. The force transmission members 36, 37 are connected to the clutch basket 3 by the cams 38, 39, which engage in the openings of the cover parts, so that they rotate together with the clutch basket around the axis of rotation A2. At the same time, the force transmission members 36, 37 are axially movable relative to the clutch basket 3 in order to transmit an axial actuating force of the actuators 32, 33 located outside the clutch basket 3 to the disk packs 4, 5 arranged in the clutch basket 3. The cams 38, 39 act on the respective pressure plate 8, 9 arranged in the clutch basket 3, which transmits the force to the respective disk pack 4, 5. The disk packs 4, 5 are axially supported axially inwardly via the support plates 76, 77 and the intermediate plates 10, 11 against the associated circlips 30, 31 connected to the clutch basket 3.

The actuators 32, 33 are configured as hydraulically actuated actuators and each comprise an annular piston 42, 43, which is axially movably received in an associated annular cylinder chamber 44, 45 of the housing assembly 12. A hydraulic pressure can be generated by means of a hydraulic pump in the hydraulic chamber 44, 45 via oil ducts not shown here, so that the piston 42, 43 inserted therein is moved axially in the direction of the clutch basket 3. Axial force is transmitted via an axial bearing 46, 47 to the respective force transmission member 36, 37. The axial bearings 46, 47 are used for rotary decoupling the force transmission members 36, 37 rotating with the clutch basket 3 relative to the actuators and pistons 42, 43, respectively, fixedly arranged in the housing 12. Return springs (not shown here) can be provided for resetting the actuators 32, 33. These can, for example, be arranged between the clutch basket 3 and the associated force transmission member 36, 37, in order to apply an axial force away from the clutch basket 3 when the actuator is not actuated.

The actuators 32, 33 are arranged radially outside the two clutch bearings 29, 30. This means that an outer diameter of the first respectively second clutch bearing 29, 30 is smaller than an inner diameter of the first respectively second actuator 32, 33. The two bearings 29, 30 are especially configured as tapered roller bearings so that they can support axial forces well and transfer them into the housing 12. The force transmission members 38, 39 acting on the disk packs 4, 5 are arranged at least to a wide extent radially outside an average diameter of the disk packs 4, 5. It is further provided that the first clutch bearing 29 at least partially axially overlaps with the first actuator 32, and/or that the second clutch bearing 30 at least partially axially overlaps with the second actuator 33.

The first clutch hub 6 is rotationally fixedly connected to the first output shaft 14, which can transmit the torque introduced via a constant velocity joint to a first side shaft (not shown). The second clutch hub 24 is connected to the second output shaft 15 in a rotatably fixed manner. The two clutch hubs 6, 7 are axially supported against each other and against the clutch basket 3. The clutch hubs 6, 7 are supported in the clutch basket 3 by bearings 48, 49 so as to be rotatable about the axis of rotation A2. For this purpose the clutch hubs 6, 7 each have a sleeve projection projecting axially outwardly. The bearings 48, 49 are located respectively between an outer surface of the sleeve projection and an inner surface of the respective cover part 17, 18.

Figure 6:
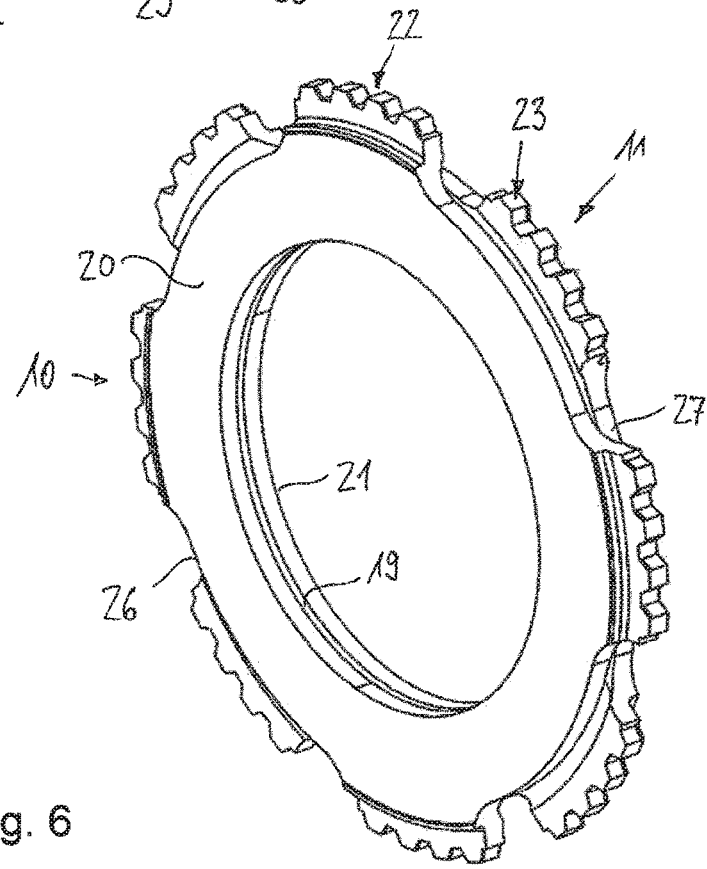
FIG. 6 shows the intermediate plate arrangement from FIG. 5 in assembled state in a perspective view.
Figure 7:
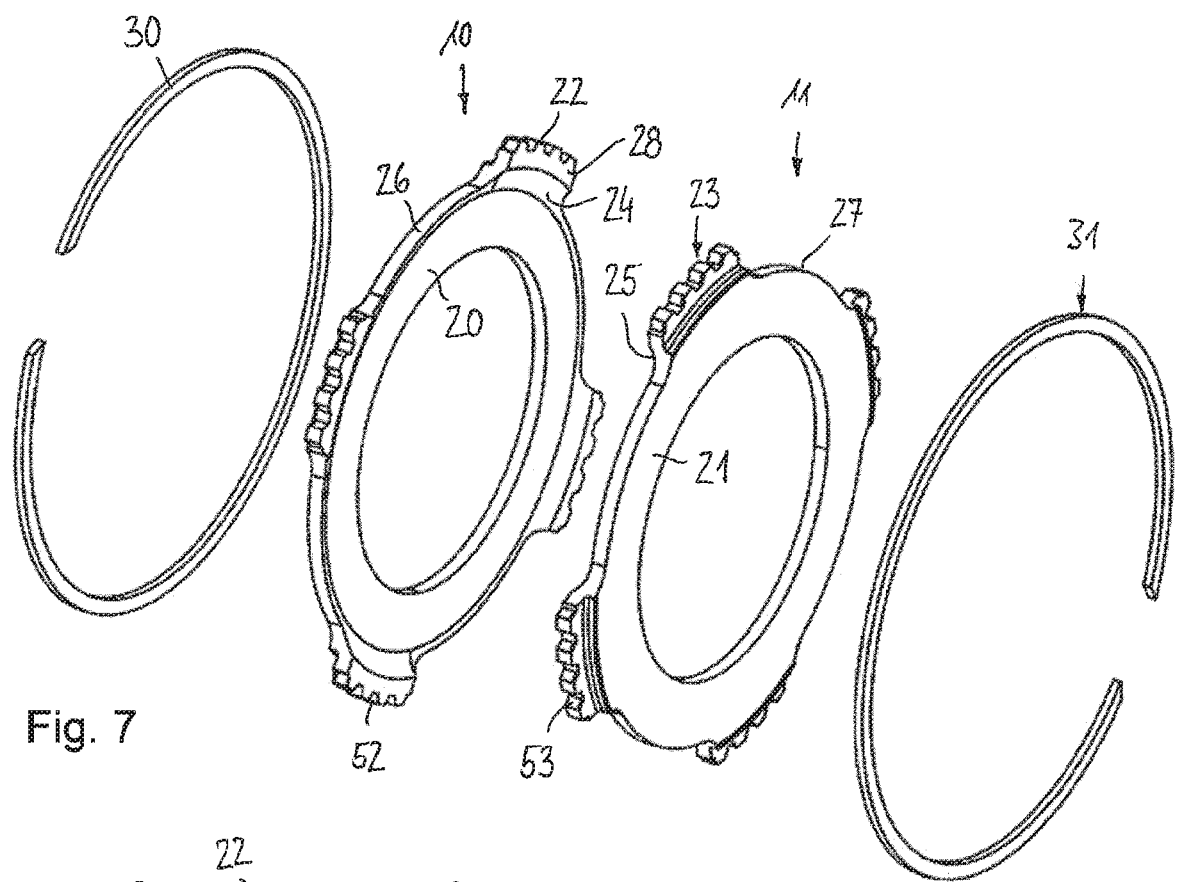
FIG. 7 shows the intermediate plate arrangement from FIG. 5 in a perspective exploded view with retaining rings.
Figure 8:
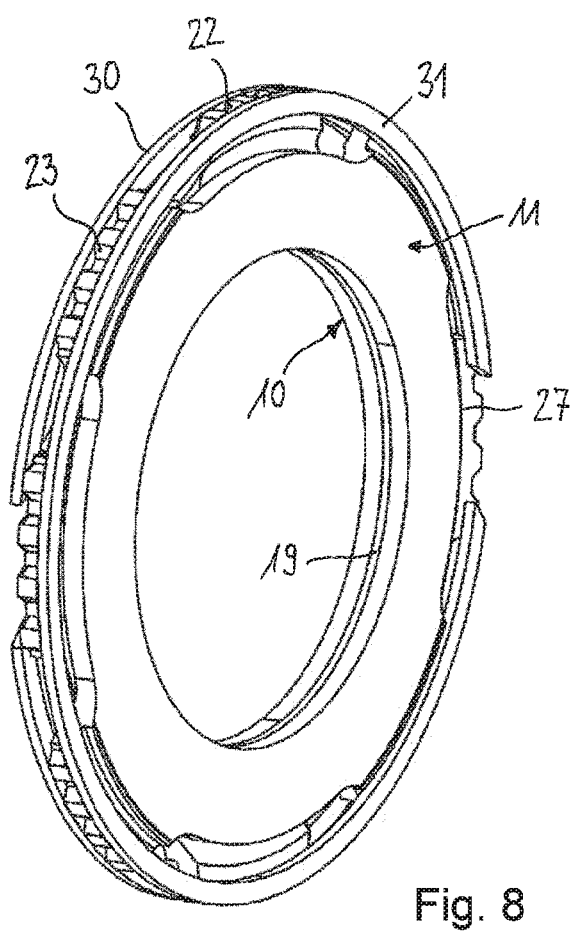
FIG. 8 shows the arrangement of FIG. 7 in assembled condition in a perspective view.
Figure 9:
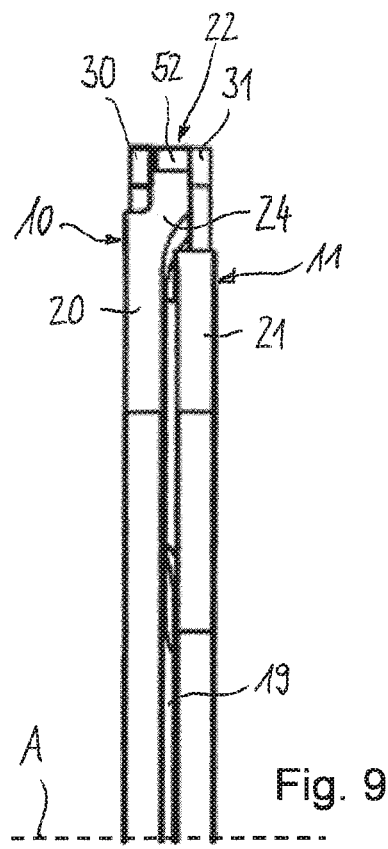
FIG. 9 shows the arrangement of FIG. 7 in assembled condition in a semi-longitudinal section.

FIGS. 5 to 9, which are jointly described below, show an example assembly in a modified embodiment for a dual clutch unit 2. This assembly corresponds largely to the intermediate plate arrangement according to FIGS. 2 to 4, so that reference is made to the above descriptions for the common features. In FIGS. 7 to 9 the circlips 30, 31 are additionally shown. The same and/or corresponding details are provided with the same reference numbers as for the above figures.

A difference is that the number of circumferentially distributed support portions 22 or recesses 26 of the first intermediate plate 10 and, respectively, the number of support portions 23 of the second intermediate plate 11, is four. As with the above embodiment, the support portions 22 of the first intermediate plate 10 engage axially in the recesses 27 of the second intermediate plate 11, and vice versa. It can be seen in particular in FIGS. 5 and 6 that the circumferential extension U22 of the first support portions 22 is smaller than a circumferential extension U27 of the second recesses 27 located between the second support portions 23, and vice versa. The two intermediate plates 10, 11 have the same design and are mounted axially in each other, offset to each other in circumferential direction. In an axially approximated mounting condition, as shown in FIGS. 6, 8 and 9, the first and second support portions 22, 23 are axially overlapping with each other, and the ring portions 20, 21 are axially spaced apart from each other by the axial gap 19. Apart from that, the structure and mode of operation correspond to those of the above embodiment, to whose description abbreviated reference is made here.

Figure 10:
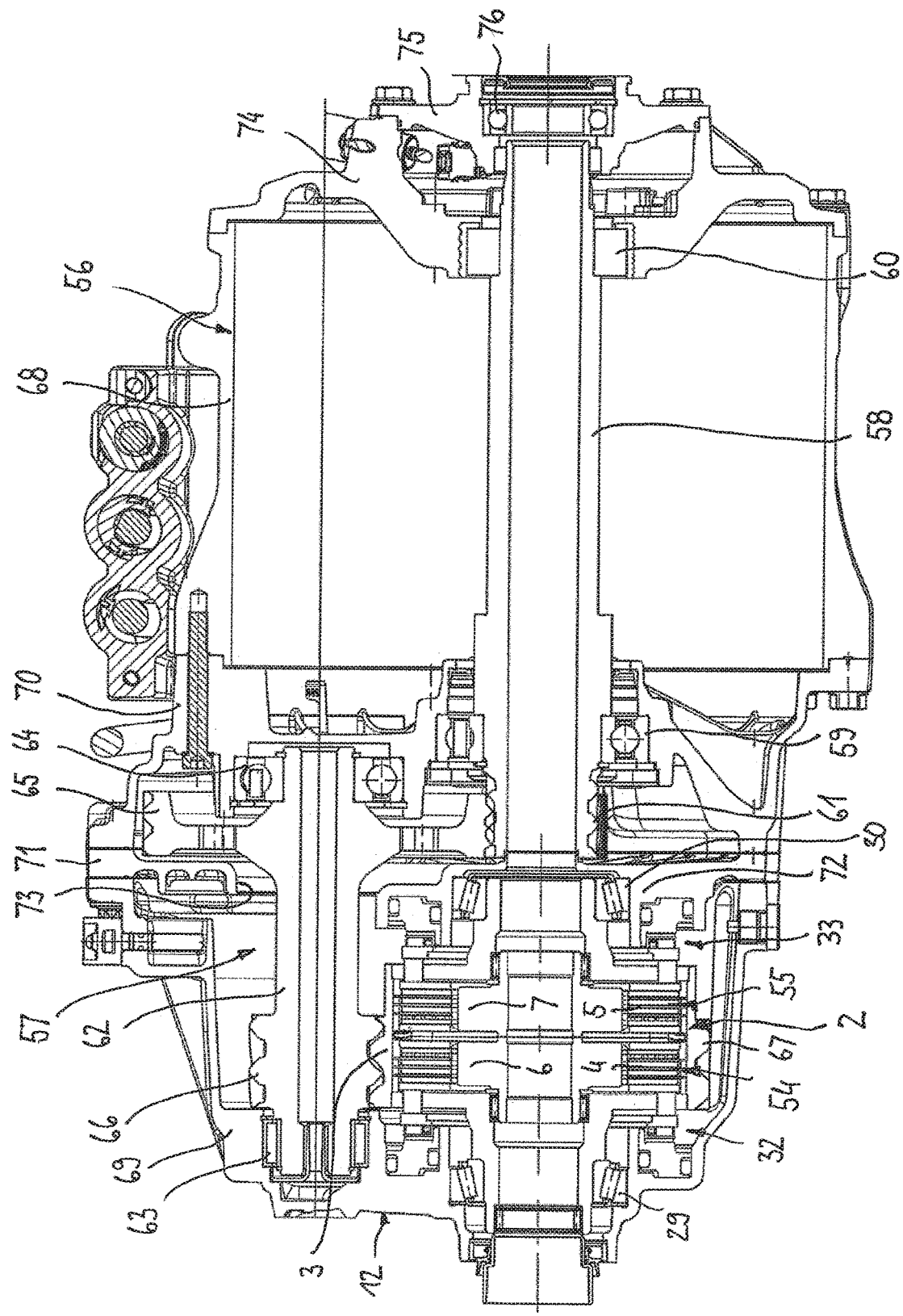
FIG. 10 shows a drive arrangement according to the invention with a dual clutch unit from FIG. 1 in a longitudinal section.

FIG. 10 shows an example electric drive 50 with an electric machine 56 and a transmission unit 57 that is drivingly rotatable by the electric machine and, drivingly rotatable by the transmission unit, a dual clutch unit 2 with two separately controllable friction clutches 54, 55 that are respectively actuatable by an associated actuator 32, 33. The electric drive 50 is configured to drive a drive axle of a motor vehicle as the only drive of this driven axle. Another motor vehicle drive axle can be driven by another drive unit with a separate drive source, such as a combustion engine. However, no mechanical drive connection is provided between the two drive systems.

The electrical machine 56 comprises a stator and a rotor rotatable thereto, which drives a motor shaft 58 rotatingly when the electrical machine is energized. The rotary motion of the motor shaft 58 is transmitted to the dual clutch unit 2 via the transmission unit 57 downstream in the power path. It can be seen that the second output shaft 15 of the clutch unit 2 extends through the hollow shaft 58 of the electrical machine 56. The dual clutch unit 2 is arranged coaxially to the electric machine 56. Specifically, the clutch basket 3 is rotatably supported in the housing assembly 12 coaxially to the motor shaft 9 by means of two clutch bearings 29, 30.

The electric machine 56 is supplied with electric current by a battery (not shown). The electrical machine 56 can operate in motor mode, where electrical energy is converted into mechanical energy to drive the drive axle, or in generator mode, where, conversely, mechanical energy is converted into electrical energy, which can then be stored in the battery. The electric drive 50 further comprises a housing assembly 12 in which the electric machine 56, the transmission unit 57 and the dual clutch unit 2 are arranged.

The transmission unit 57 is designed in the form of a reduction transmission, which converts a rotary motion introduced by the motor shaft 58 from high speed to slow speed. Thus, an input part of the dual clutch unit 2 rotates many times slower than the motor shaft 58 of the electric machine 56. The dual clutch unit 2 distributes the introduced torque to the two output parts 6, 7, which serve to drive an associated vehicle wheel. The motor shaft 58 is supported by means of bearings 59, 60 in the housing assembly 12 of the electric drive 50 so that it can rotate about the axis of rotation A58. A drive gear 61 (first gear) is rotationally fixedly connected to the motor shaft 58, in particular is configured in one piece with the motor shaft 58.

The reduction transmission 57 comprises a transmission shaft 62, which via bearings 63, 64 is rotatably supported in the housing assembly 12 around a second axis of rotation A62 parallel to the first axis of rotation A58 and which can also be referred to as an intermediate shaft. The transmission shaft 62 comprises a drive gear 65 (second gear) and an output gear 66 (third gear), which are rotatably fixedly connected to the transmission shaft, in particular are formed in one piece therewith. The output gear 66 meshes with the ring gear 67 (fourth gear) to drive the dual clutch unit 2. The ring gear 67 is fixedly connected to the input part 3 of the dual clutch unit 2, in particular formed in one piece therewith. The output gear 66 of the transmission shaft 62 and the ring gear 67 of the clutch input part each have helical toothings.

It can be seen that the reduction transmission 57 has exactly one transmission shaft 62 and two gear pairs. The drive gear 61 of the motor shaft 58 and the drive gear 65 of the transmission shaft 62 meshing therewith form a first gear pair of the transmission 57 with a first transmission ratio. The output gear 66 of the transmission shaft 62 and the ring gear 67 meshing therewith form a second gear pair. The motor shaft drive gear 61 has a much smaller diameter respectively a smaller number of teeth than the diameter respectively the number of teeth of the transmission shaft drive gear 65. In this way, a transmission to slow speed is realized. Likewise, the transmission shaft output gear 66 has a smaller diameter, respectively a smaller number of teeth, than the ring gear 67, so that a further transmission to slow speed is realized.

The housing assembly 12 is composed of several individual housing parts and comprises in particular a first housing portion 68, in which the electric motor 56 is accommodated, and a second housing portion 69, in which the transmission unit 57 is accommodated, as well as a first intermediate wall 70 and a second intermediate wall 71, which are arranged between the first and second housing portions 68, 69 and firmly connected thereto. The first intermediate wall 70 has bearing support portions for the bearing 59 to support the hollow shaft 58 and for the bearing 64 to support the transmission shaft 62. Axially between the first intermediate wall 70 and the second intermediate wall 71, a receiving chamber is formed in which the drive gears 61, 65 are received. The second intermediate wall 70 has a bearing support portion 72 for the bearing 49 for rotatably supporting the clutch basket 3, as well as a through opening 73 through which the transmission shaft 62 extends.

An advantage of the dual clutch unit 2 and a drive assembly equipped therewith is that a power transmission from the first disk pack 4 via the first intermediate plate 10 into the clutch input part 3 takes place independently of a power transmission from the second disk pack 5 via the second intermediate plate 11 into the input part 3. The axial forces acting in the first direction are introduced into the clutch input part 3 via the first portions 22, 24 of the first intermediate plate 10 past the second intermediate plate 11, and vice versa. An undesired mutual influence of the clutch forces is excluded, so that the clutches can be controlled quickly and precisely.

LIST OF REFERENCE SIGNS 2 dual clutch unit
3 input part
4, 5 disk pack
6, 7 output part
8, 9 pressure plate
10, 11 intermediate plate
12 housing
13 receiving chamber
14, 15 output shaft
16 casing portion
17, 18 cover portion
19 ring gap
20, 21 ring portion
22, 23 support portion
24, 25 transition portion
26, 27 recess
28, 29 contact surface
30, 31 circlip
32, 33 actuator
34, 35 sleeve projection
36, 37 force transmission member
38, 39 cam
40, 41 opening
42, 43 piston
44, 45 cylinder chamber
46, 47 axial bearing
48, 49 bearing
50 electric drive
51 engagements means (3)
52, 53 engagements means
54, 55 clutch
56 electric machine
57 transmission unit
58 motor shaft
59, 60 bearing
61 drive gear
62 transmission shaft
63, 64 bearing
65 input gear (second gear)
66 output gear (third gear)
67 ring gear
68 housing portion
69 housing portion
70 intermediate wall
71 intermediate wall
72 bearing support portion
73 through opening
74 cover part
75 bearing support element
76, 77 outer disk
78, 79 inner disk
A axis of rotation
B width
F force
R direction
U circumferential extension

The invention claimed is:

1. A dual clutch unit for variably distributing torque to two output shafts, comprising:

a clutch input part rotatably drivable about an axis of rotation;

a first disk pack for transmitting torque from the clutch input part to a first clutch output part, wherein the first disk pack is axially loadable by a first pressure plate and is supported axially against the clutch input part via a first intermediate plate; and a second disk pack for transmitting torque from the clutch input part to a second clutch output part, wherein the second disk pack is axially loadable by a second pressure plate and is supported axially against the clutch input part via a second intermediate plate;

wherein the first intermediate plate and the second intermediate plate are axially arranged between the first disk pack and the second disk pack and wherein the first intermediate plate includes first portions and the second intermediate plate includes second portions, the first portions and second portions extending axially into each other such that the first intermediate plate and the second intermediate plate are axially supported independently of one another against the clutch input part.

2. The dual clutch unit according to claim 1,
wherein a first contact surface of the first intermediate plate, which faces axially away from the first disk pack and which is axially supported against the clutch input part in a first direction, and a second contact surface of the second intermediate plate, which faces axially away from the second disk pack and which is axially supported against the clutch input part in an opposing second direction, are arranged axially offset relative to each other.

3. The dual clutch unit according to claim 1,
wherein the first intermediate plate and the second intermediate plate are each disposed outside a flux of force from the other of the first and second intermediate plates to the clutch input portion.

4. The dual clutch unit according to claim 1,
wherein the first intermediate plate has a first ring portion against which the first disk pack is axially supported,
wherein the second intermediate plate has a second ring portion, against which the second disk pack is axially supported, and
wherein the first ring portion and the second ring portion are axially spaced apart from each other.

5. The dual clutch unit according to claim 4,
wherein the first intermediate plate comprises a plurality of first support portions distributed over the circumference, with which the first intermediate plate is axially supported against the clutch input part,
wherein the second intermediate plate comprises a plurality of second support portions distributed over the circumference, with which the second intermediate plate is axially supported against the clutch input part, and
wherein the first support portions and the second support portions are circumferentially offset from each other.

6. The dual clutch unit according to claim 5,
wherein first recesses are formed respectively between the first support portions distributed over the circumference, into which the second support portions extend axially, and
wherein second recesses are formed respectively between the second support portions distributed over the circumference, into which the first support portions extend axially.

7. The dual clutch unit according to claim 6,
wherein a circumferential extension of the first support portions is smaller than a circumferential extension of the second recesses located between the second support portions, and
wherein a circumferential extension of the second support portions is smaller than a circumferential extension of the first recesses located between the first support portions.

8. The dual clutch unit according to claim 5,
wherein the first support portions and the second support portions axially overlap each other.

9. The dual clutch unit according to claim 8,
wherein an axial width of the axially overlapping first and second support portions is smaller than a sum of the axial widths of the first ring portion and the second ring portion.

10. The dual clutch unit according to claim 5,
wherein between the first ring portion and the first support portions respective first transition portions are formed which are axially cranked in the first direction, and
between the second ring portion and the second support portions respective second transition portions are formed which are axially cranked in the second direction.

11. The dual clutch unit according to claim 5,
where in the first support portions and the second support portions are connected to the clutch input part in a rotationally fixed manner.

12. The dual clutch unit according to claim 5,
wherein the first support portions and the second support portions are axially fixed between two retaining rings at the clutch input part, wherein the two retaining rings are arranged within an axial extension of the first and second intermediate plate.

13. The dual clutch unit according to claim 1,
wherein the first intermediate plate and the second intermediate plate have identical dimensions.

14. The dual clutch unit according to claim 1,
wherein a first actuator for loading the first disk pack and a second actuator for loading the second disk pack are provided,
wherein the first actuator and the second actuator are controllable independently of one another by a control unit, so that a first torque transmittable from the first disk pack to the first output part, and a second torque transmittable from the second disk pack to the second output part, can be variably set independently of each other.

15. The dual clutch unit according to claim 14,
wherein the clutch basket has a first cover portion and a second cover portion which laterally delimit the receiving chamber of the clutch basket;
wherein the first actuator is disposed outside the clutch basket and is axially supported on the housing, wherein a first force transmission member is provided for transmitting an axial force generated by the first actuator to the first disk pack disposed in the clutch basket, wherein the first cover portion comprises a plurality of circumferentially distributed first through openings through which cams of the first force transmission member extend; and
wherein the second actuator is arranged outside the clutch basket and is axially supported on the housing, wherein a second force transmission member is provided for transmitting an axial force generated by the second actuator to the second disk pack arranged in the clutch basket, wherein the second cover portion having a plurality of circumferentially distributed second through openings through which cams of the second force transmission member extend.

16. The dual clutch unit according to claim 1,
wherein the clutch input part is configured as a clutch basket which is rotatably supported in a stationary housing and which forms a receiving chamber in which the first disk pack, the first intermediate plate, the second intermediate plate and the second disk pack are received.

17. An electric drive for driving a drive axle of a motor vehicle, comprising:
an electric machine with a motor shaft; and
a transmission unit configured to transmit a rotational movement introduced by the electric machine from high speed to slow speed;
wherein a dual clutch unit is provided comprising
a clutch input part rotatably drivable about an axis of rotation;
a first disk pack for transmitting torque from the clutch input part to a first clutch output part, wherein the first disk pack is axially loadable by a first pressure plate and is supported axially against the clutch input part via a first intermediate plate; and
a second disk pack for transmitting torque from the clutch input part to a second clutch output part, wherein the second disk pack is axially loadable by a second pressure plate and is supported axially against the clutch input part via a second intermediate plate;
wherein the first intermediate plate and the second intermediate plate are axially arranged between the first disk pack and the second disk pack, and wherein the first intermediate plate includes first portions and the second intermediate plate includes second portions, the first portions and second portions extending axially into each other such that the first intermediate plate and the second intermediate plate are axially supported independently of each other against the clutch input part; and
wherein the clutch input part is rotatably drivable by an output gear of the transmission unit.

18. The electric drive according to claim 17,
wherein the motor shaft is formed as a hollow shaft which is supported in a stationary housing so as to be rotatable about an axis of rotation, wherein the clutch input part is rotatably supported coaxially with the axis of rotation of the motor shaft; wherein the transmission unit comprises a transmission shaft which is rotatably driveable by the motor shaft and is supported in the housing so as to be rotatable about an axis of rotation parallel to the axis of rotation; and
wherein the first clutch output part is configured to drive a first output shaft and the second clutch output part is configured to drive a second output shaft, wherein one of the two output shafts extends through the hollow shaft of the electric machine.

19. A dual clutch unit for variably distributing torque to two output shafts, comprising:
a clutch input part rotatably drivable about an axis of rotation;
a first disk pack for transmitting torque from the clutch input part to a first clutch output part, wherein the first disk pack is axially loadable by a first pressure plate and is supported axially against the clutch input part via a first intermediate plate; and a second disk pack for transmitting torque from the clutch input part to a second clutch output part, wherein the second disk pack is axially loadable by a second pressure plate and is supported axially against the clutch input part via a second intermediate plate;

wherein the first intermediate plate and the second intermediate plate are axially arranged between the first disk pack and the second disk pack, wherein the first intermediate plate comprises a plurality of first support portions distributed over the circumference, via which the first intermediate plate is axially supported against the clutch input part, wherein the second intermediate plate comprises a plurality of second support portions distributed over the circumference, via which the second intermediate plate is axially supported against the clutch input part, and wherein the first support portions and the second support portions are circumferentially offset from each other such that the first intermediate plate and the second intermediate plate are axially supported independently of one another against the clutch input part.

* * * * *